United States Patent

Sugimoto et al.

[11] 3,904,616
[45] Sept. 9, 1975

[54] CEPHALOSPORINS

[75] Inventors: Keiichi Sugimoto, Kawanishi; Kunio Kobayashi, Toyonaka; Koji Nishijima, Takatsuki; Shiro Morimoto, Tantakabayashi, all of Japan

[73] Assignee: Takeda Chemical Industries, Ltd., Japan

[22] Filed: July 18, 1972

[21] Appl. No.: 273,019

[30] Foreign Application Priority Data
July 29, 1971   Japan................................ 46-56894

[52] U.S. Cl............................. 260/243 C; 424/246
[51] Int. Cl............................. C07d 99/24
[58] Field of Search .................. 260/243 C

[56] References Cited
UNITED STATES PATENTS
3,647,789   3/1972   Crast.............................. 260/243 C
3,719,673   3/1973   Bickel et al..................... 260/243 C Primary Examiner—Nicholas S. Rizzo
Attorney, Agent, or Firm—Wenderoth, Lind & Ponack

[57] ABSTRACT

Novel cephalosporins of the formula

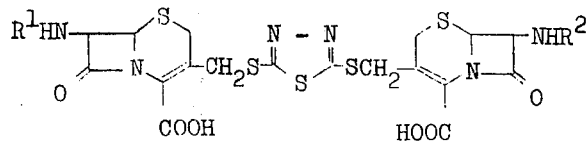

wherein $R^1$ and $R^2$ are, the same or different, hydrogen atom or an acyl group of the formula;

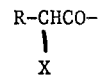

wherein R represents phenyl, phenylthio, thienyl, 2-oxo-primidin-4-ylthio, 2-chloro-pyrimidin-4-ylthio, pyridylthio or 2-oxo-5-methyl-pyrimidin-4-ylthio and X represents hydrogen, carboxyl, carbamoyl, carbamolyoxy, amino, or sulfo and pharmaceutically acceptable salts thereof are stable against an acid and have a broad antimicrobial spectrum.

17 Claims, No Drawings

CEPHALOSPORINS

This invention relates to novel cephalosporins and the production thereof. More particularly, the present invention is concerned with novel cephalosporins of the formula

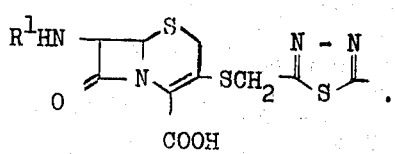

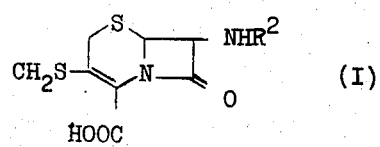

(I)

wherein $R^1$ and $R^2$ respectively stand for the same or different hydrogen atom or an acyl group of the formula:

R—CHCO—
  |
  X wherein R represents phenyl, phenylthio, thienyl, 2-oxo-primidin-4-ylthio, 2-chloro-pyrimidin-4-ylthio, pyridylthio or 2-oxo-5-methyl pyrimidin-4-ylthio and X represents hydrogen, carboxyl, carbamoyl, carbamolyoxy, amino, or sulfo and pharmaceutically acceptable salts, thereof, and a method for the production thereof.

The cephalosporins of the formula (I) include the following four types of compounds, namely, (1) compounds of the formula (I) wherein both of $R^1$ and $R^2$ are hydrogen atom, (2) compounds of the formula (I) wherein one of $R^1$ and $R^2$ is hydrogen atom and the other is an acyl group, (3) compounds of the formula (I) wherein both $R^1$ and $R^2$ are the same acyl group and (4) compounds of the formula (I) wherein $R^1$ and $R^2$ stand for different acyl groups from each other.

Almost all hitherto known cephalosporins have only one cephem nuclear in their molecules, which are hereinafter sometimes referred to as "cephalosporin monomers." They are useful for the treatment of various infectious diseases caused by gram-positive or gram-negative bacteria, but, more or less, unstable in acid conditions. Therefore they have not been suitable for oral administration.

The inventors have found that the present novel cephalosporins which have two cephem nuclears in their molecules, which are hereinafter sometimes referred to as "cephalosporin dimers," are remarkably stable against an acid. In fact, they are very stable in an acid condition, for example, in an artificial gastric juice (ph 2, 37°C). Accordingly, these compounds are suitable for oral administration. Moreover, the novel cephalosporin dimers are equal or superior to each of starting cephalosporin monomers in antimicrobial activity against gram-positive, resistance-aquired gram-positive and gram-negative bacteria.

The acyl group represented by $R^1$ or $R^2$ in the formula (I) may be any of acyl groups attached to amino group at 6-position of hitherto-known penicillines or at 7-position of hitherto-known cephalosporins. The acyl group is exemplified by aliphatic carboxylic acid acyl groups such as alkanoyl, e.g. hexanoyl, heptanoyl, octanoyl, such as cycloalkanoyl, e.g. cyclopentanoyl, such as mono-substituted alkanoyl, e.g. phenylacetyl, 1-cyclohexylacetyl, 1-cyclohexenylacetyl, thienylacetyl, tetrazorylacetyl, cyanoacetyl, phenoxyacetyl, phenoxybutyloyl, nitrophenylacetyl, phenylpropionyl, butylthioacetyl, phenylthioacetyl chlorophenylthioacetyl, benzylthioacetyl, phenethylthioacetyl, allylthioacetyl, pyridylthioacetyl, benzylthiopropionyl, such as disubsituted alkanoyl e.g. α-carboxyphenylacetyl, α-aminophenylacetyl, α-bromopropionyl, α-hydroxyphenylacetyl, α-sulfophenylacetyl, α-phenoxypropionyl, α-phenoxybutyloyl, alkenoyl such as acryloyl, such as aromatic carboxylic acid acyl groups, e.g. benzoyl, 2,6-dimethoxybenzoyl, such as heterocyclic acyl group e.g., 2-oxopyrimidinyl-4-thioacetyl, 2-chloropyrimidinyl-4-thioacetyl, 5-methyl-3-phenyl-4-isoxazolylcarbonyl, 3-(2-chlorophenyl)-5-methyl-4-isoxazolylcarbonyl, 3-(2,6-dichlorophenyl)-5-methyl-4-isoxazolylcarbonyl, 2-oxo-5-methylpyrimidinyl-4-thioacetyl, such as acyl groups containing amino groups, e.g. phenylglycyl, cyclohexenylglycyl, thienylglycyl, furylglycyl, cyclohexedienylglycyl, phenylmethylglycyl, carbamoylphenylacetyl, carbamoyloxyphenylacetyl, 5-amino-5-carboxyvaleryl. In addition, the acyl groups containing amino groups may be those of which amino groups are protected by carbobenzoxy, phthaloyl, phenylthiocarbonyl, methylsulfonylethoxycarbonyl, isobornyloxycarbonyl, benzyloxycarbonyl and the like.

The compounds (I) may be in the form of pharmaceutically acceptable salts with metals such as sodium, potassium, calcium, aluminum, magnesium and the like, ammonium or amines such as trimethylamine, triethylamine, tributylamine, triamylamine, pyridine or the like.

The cephalosporins of the formula (I) can be produced by reacting 2,5-dimercapto-1,3,4-thiadiazole with a compound of the formula

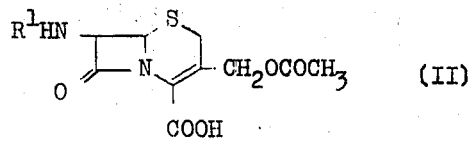

(II)

wherein $R^1$ has the same meaning as defined above or a reactive derivative at 3-position of the said compound and a compound of the formula

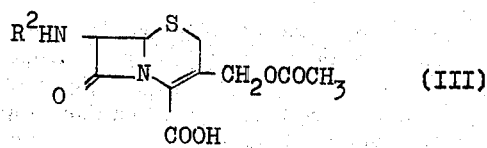

(III)

wherein $R^2$ has the same meaning as defined above or a reactive derivative at 3-position of the said compound, optionally subjecting an intermediate of the formula

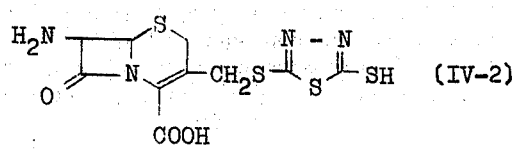

(IV-2)

to an acylation reaction, and optionally subjectng the compound of the formula (I) wherein at least one of R¹ and R² is hydrogen atom to an acylation reaction.

The reactive derivative at 3-position of the compound (II) or (III) is one which has a group capable of undergoing a substitution reaction with thiol group like the acetoxy moiety of 3-acetoxymethyl groups. There may, for example, be acyloxy groups which may have such substituents as hydroxy, haloacetoxy, propionyloxy, etc., thiol, and halogens such as bromine, iodine and fluorine.

The method for producing the cephalosporins (I) includes the following reactions which are illustrated in Scheme-1.

triamylamine, pyridine. Further, they may be in the form of esters, preferably easily hydrolyzable esters, such as methyl, ethyl, benzyl methoxybenzyl, nitrobenzyl, phenyl, nitrophenyl methoxyphenyl, benzhydryl, trichloroethyl, trimethylsilyl, methylsulfonylethyl ester.

In step (d), an intermediate corresponding to the compound of the formula (IV-1) in step (a)-(e) is, in general, not separated from the reaction mixture, but it must be produced once in the course of the reaction. Therefore, step (d) is substantially the same as step (a)-(e). Similarly, step (c), step (i) and step (m) are substantially the same as the step (a)-(f) or step (b)-(g), step (b)-(h) and step (k)-(1), respectively.

In step (a) and (b), the compound (V) is reacted

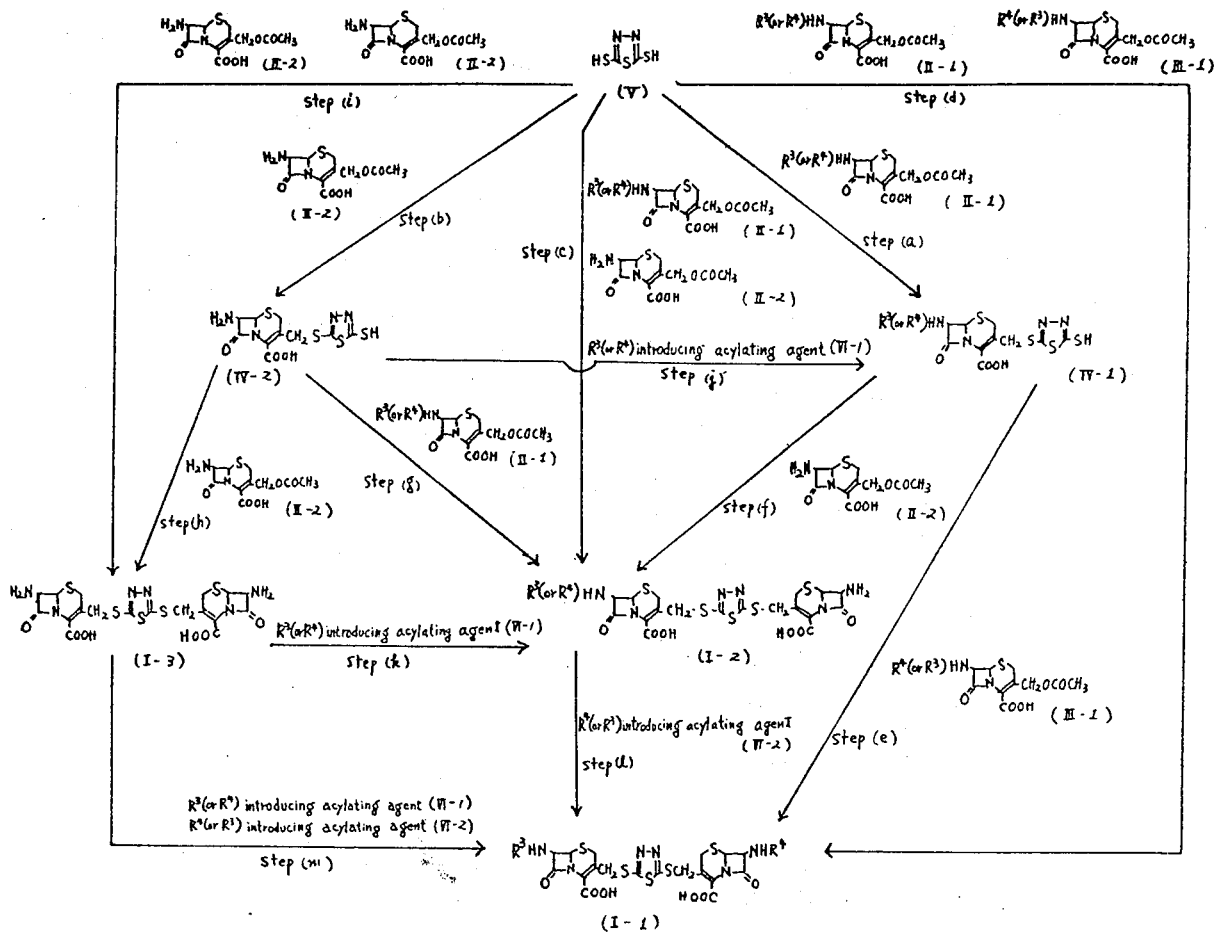

Scheme 1 wherein R³ has the same meaning as R¹ except the case of R¹ being hydrogen atom and R⁴ has the same meaning as R² except a case of R² being hydrogen atom.

The cephalosporins (I) including the compound (I-1), (I-2) and (I-3) can be led by, for example, the following steps; step(a)-(e), step(d), step(a)-(f) [and -(1)], step(c) [and-(1)], step(b)-(j)-(f)[and-(1)], step(b)-(j)-(e), step(b)-(g)[and-(1)], step(b)-(h)[and-(k), and-(k)-(1), and-(m)]and step(i)[and-(k), and-(k)-(1), and-(m)].

The compounds represented by the formulae; (V), (II-1), (III-1), (II-2), (IV-1), (IV-2), (I-1), (I-2) and (I-3) in Scheme-1 may be in the form of salts with metals such as sodium, potassium, calcium, aluminum, magnesium and with ammonium and with amines such as trimethylamine, triethylamine, tributylamine, with about 0.5 to 2 mole, preferably about 0.5 to 1 mole equivalent, of the compound (II-1) and the compound (II-2), respectively, relative to the compound (V). In step (k), the compound (I-3) is reacted with about 0.5 to 2 mole, more preferably, about 0.5 to 1 mole equivalent of the compound (VI-1) relative to the compound (I-3). In other steps, the molar ratio of the starting compounds is largely, optional and, in general, one starting compound is reacted with about 0.2 to 5.0 moles equivalent to the other starting compound.

The reactions of steps (a), (b), (c), (d), (e), (f), (g), (h) and (i) are in general, carried out in a suitable solvent. Typical solvents include alcohols such as methanol, ethanol, propanol and the like, ketones such as acetone, methyl ethyl ketone, methyl isobutyl ketone and the like, dimethylformamide, dimethylsulfoxide, dioxane, chloroform, dichloromethane, dichloroethane and other organic solvents, which do not prevent the desired reaction. Among these, the solvents having strong polarity are particularly preferred. Water alone or a mixture of water and the hydrophillic solvents may also be used. It is advantageous to adjust the pH value of the reaction mixture in the range from 2 to 10, more preferably, from 4 to 8. For this purpose, suitable buffer agents such as sodium acetate may be added to the reaction mixture. The reaction temperature may be employed in the range not higher than the boiling point of the solvent employed, but it is preferably between 0° and 120°C more preferably, between 30°C and 100°C. The reaction is carried out for a few minutes to scores of hours until the yield of the desired compound (I-1), (I-2), (I-3), (IV-1) or (IV-2) becomes maximal, for example, between 1 hour and 12 hours, more preferably, 2 hours and 6 hours. In steps (j), (k), (1) or (m), the compound (IV-2), (I-2) and (I-3) are reacted with acylating agents to introduce acyl groups $R^3$- and/or $R^4$- to amino group(s) in the compounds. In these acylation reactions, the carboxyl group of the said compounds may be protected as in the form of an ester such as benzyl, β-methylsulphenylethyl, benzhydryl, trimethylsilyl, ester and the like.

As the acylating agents, there may be exemplified by carboxylic acid, carbonic acid, organic phosphoric acid and their reactive derivatives such as their acid halides (e.g. acid chlorides, acid bromides), their acid anhydrides, their mixed anhydrides, their acid azides or active esters with pentachlorophenyl, p-nitrophenyl, N-phydroxysuccimide, and ones obtainable from a carboxylic acid and condensing agents such as carbodiimide, N,N'-carbodiimidazole, ethylene ether and the like.

The acylation reaction may usually be to conducted in the presence of a solvent. The suitable solvents are organic solvents such as acetone, dioxane, chloroform, methylene chloride, tetrahydrofuran, ethers, ethyl acetate ester and the like. Water or aqueous solvents may also be usable depending on the kinds of the starting materials. The reaction temperature is in a wide range, but it is often advantageous to carry out the reaction at a temperature ranging from −30°C to 100°C, especially, −20°C to 60°C. When the reaction gives rise to an acid, it is desirable to add a base such as alkali hydrogen carbonate, alkali carbonate, alkali hydroxide, and organic amines such as triethylamine and pyridine in the reaction system. When the easily hydrolizable ester of a cephalosporin compound is used as the starting material, hydrolysis may be conducted after the reaction according to a method conventionally applied for hydrolysis of esters, e.g. treatment with acids or bases, etc. The reaction products can be separated according to conventional methods such as solvent extraction, chromatography and the like. They may further, if desired, be refined by way of recrystallization and the like.

In either method, the reaction solution obtained is concentrated under reduced pressure at a low temperature. Then, a portion of organic solvents used in the reaction are removed by distillation. After the remaining liquid is adjusted to be acid, extraction is effected by the use of organic solvents such as ethyl acetate, butanol, chloroform or the like. The organic solvents are again distilled off by evaporation under reduced pressure at a low temperature, until the crude powder of the object cephalosporins are obtained.

The thus obtained products may be made into salts of sodium, potassium, organic amines and the like according to suitable methods. Such salts are water-soluble, so that they may highly be evaluated as antimicrobial agents in various fields.

Antimicrobial spectrum (mcg./ml., agar dilution method) of the cephalosporins of the formula (I) is shown in the following Table 1.

Table I.

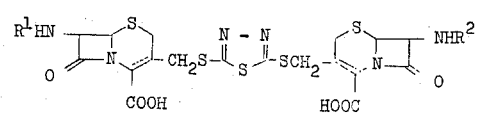

| Test compound | A | B | C | D | E | F | G | H | J | K |
|---|---|---|---|---|---|---|---|---|---|---|
| S.aureus 209P | <0.01 | 0.2 | 0.5 | 0.1 | 1 | 0.1 | 0.05 | <0.01 | 0.05 | 0.05 |
| S.aureus No.87 | 0.1 | 2 | 2 | 2 | 5 | 1 | 0.5 | 0.2 | 0.2 | 0.5 |
| E.coli NIHJ | 10 | 0.5 | 1 | 0.5 | 5 | 2 | 2 | 2 | 0.5 | 0.5 |
| K.pneumoniae Kb1 | 5 | 50 | 50 | 50 | 10 | 10 | 50 | 10 | 10 | 10 |
| P.vulgaris Eb51 | 0.5 | 1 | 20 | 2 | 10 | 5 | 10 | 5 | 0.5 | 0.5 |
| P.morganii Eb54 | >100 | 2 | 50 | 50 | 50 | >100 | >100 | >100 | 5 | 100 |
| P.mirabilis Eb59 | 10 | 5 | 100 | 10 | 50 | 10 | 50 | 20 | 5 | 50 |
| P.morganii Eb53 | >100 | 20 | >100 | >100 | 100 | >100 | >100 | >100 | 50 | 5 |
| Ps.aeruginosa 10490 | >100 | 100 | >100 | >100 | 100 | >100 | >100 | >100 | >100 | 50 |

It is of great interest that the compound of the formula (I) wherein $R^1$ and $R^2$ are different from each other, for example, compounds (J) and (K) listed in the above table, has a broad antimicrobial spectrum covering both that of one starting cephalosporin monomer having $R^1$ and that of the other startng cephalosporin monomer having $R^2$.

The cephalosporins of the formula (I) are generally administered orally as well as in an injectable form, etc. in a similar manner to the known cephalosporin preparations, but their dosage, dosage form, etc. vary with the groups represented $R^1$ and $R^2$. In case of oral administration, the effective daily dose to a human adult of the compound formula (I) is about 0.15 gram to 1.0 gram per 4 to 6 hours.

For further explanation of the present invention, following Examples are given wherein the word "part(s)" is based on weight unless otherwise noted, and the relationship between "part" and "volume part" corresponds to that between "gram" and "milliliter."

EXAMPLE 1

(1) 7-(Iso-bornyloxyarbonylamino-cephalosporanic acid

In 20 parts by volume of water are suspended 2.72 parts by weight of 7-aminocephalosporanic acid, to which is added 0.84 part by weight of sodium bicarbonate. To the mixture is added 20 parts by volume of tetrahydrofuran and is further added 3.05 parts by weight of iso-bornyloxycarbonyl chloride dropwise while adjusting the pH to about 7 with 1N sodium hydroxide. The reaction is continued for another 3 hours at room temperature. After the reaction mixture is washed with 40 parts by volume of ether, its pH is adjusted to about 2 with 1N hydrochloric acid, and extracted with 100 parts by volume of ethyl acetate, dried with sodium sulfate and concentrated to dryness, whereby 3.0 parts by weight of the desired product is obtained in the form of pale-yellowish powder.

IR(KBr, cm$^{-1}$): 1785($\beta$-lactam),
1725–1745 (—O—CO—, —COO$^-$).

(2)
7-Amino-3-(2-mercapto-1,3,4-thiadiazol-5-ylthio)-methyl-ceph-3-em-4-carboxylic acid disodium salt In 40 parts by volume of water are suspended 2.4 parts by weight of 7-iso-bornyloxycarbonylamino cephalosporanic acid and 1.8 part by weight of 2,5-dimercapto-1,3,4-thiadiazole. The pH of the mixture is adjusted to 6.5 with 1N sodium hydroxide. The mixture is heated at 50°C for 4 hours with stirring and cooled, whereafter the pH of the reaction mixture is adjusted to 2.0 with 1N hydrochloric acid. The precipitate is filtrated and dried, to which is added 30 parts by volume of trifluoroacetic acid and 1 part by volume of anisol. The reaction is continued for another 2 hours at room temperature and then is concentrated to dryness. The concentrate is washed with 20 parts by volume of ether and dried to give 1.35 part by weight of the desired product in the form of yellowish brown powder.

NMR(D$_2$O, ppm): 3.60(d,2H), 4.17(d,2H), 5.00(d.1H). IR(KBr, cm$^{-1}$): 1750($\beta$-lactam), 1605(—COO$^-$).

(3)
2,5-Bis(7-amino-4-carboxy-ceph-3-em-3-ylmethylthio)-1,3,4-thiadiazole ditrifluoroacetate In 50 parts by volume of water are suspended 2.3 parts by weight of 7-isobornyloxycarbonylamino cephalosporanic acid and 0.37 part by weight of 2,5-dimercapto-1,3,4-thiadiazole. The pH of the suspension is adjusted to 6.5 with sodium bicarbonate, and the suspension is heated at 50°C for 3 hours, then concentrated to dryness, to which are added 20 parts by volume of trifluoroacetic acid and 1 part by volume of anisol. The reaction is continued for another 2 hours at room temperature and then the reaction mixture is concentrated to dryness. The crude products thus obtained are washed with 20 parts by volume of ether and dried, whereby 0.9 part by weight of the desired product is obtained in the form of yellowish powder.

IR (KBr, cm$^{-1}$): 1765($\beta$-lactam), 1610(—COO$^-$).

EXAMPLE 2

7-Amino-3-(2-mercapto-1,3,4-thiadiazol-5-ylthio)-methyl-ceph-3-em-4-carboxylic acid disodium salt In 50 parts by volume of water are suspended 2.7 parts by weight of 7-aminocephalosporanic acid and 3.0 parts by weight of 2,5-dimercapto-1,3,4-thiadiazole. The pH of the mixture is adjusted 6.8 with 1N sodium hydroxide and it is heated at 40°C for 8 hours with stirring. After cooling, the pH is adjusted to 3.0 with 1N hydrochloric acid. The precipitate is filtered and the crude crystals are suspended in 30 parts by volume of water. The pH of the suspension is neutralized to 7.0 with 1N sodium hydroxide, followed by freeze-drying to give 2.6 parts by weight of the desired product in the form of red-brown powder. The NMR and IR values of the desired compound is the same as those of the compound in Example 1-(2).

EXAMPLE 3

2,5-Bis(7-amino-4-carboxy-ceph-3-em-3-ylmethylthio)-1,3,4-thiadiazole disodium salt In 50 parts by volume of water are dissolved 4.0 parts by weight of 7-amino-3-(2-mercapto-1,3,4-thiadiazol-5-yl-thio)-methyl-ceph-3-em-4-carboxylic acid disodium salt and 3.0 parts by weight of 7-aminocephalosporanic acid sodium salt. The pH of the mixture is adjusted to 6.7 with 1N hydrochloric acid and further the mixture is heated at 40°C for 8 hours. The reaction mixture is cooled and the pH is adjusted to 3.0 with 1N hydrochloric acid. The crystals precipitated are collected by filtration.

The precipitates are suspended in 50 parts by volume of water and the pH is neutralized to 7 with 1N sodium hydroxide, followed by freeze-drying to give 6.1 parts by weight of the desired products in the form of powder.

NMR(D$_2$O, ppm) : 3.58(d,4H), 4.20(d,4H), 4.98(d,2H). IR(KBr, cm$^{-1}$): 1750($\beta$-lactam), 1605(—COO$^-$).

EXAMPLE 4

2,5-Bis[7-(2-thienylacetamido)-4-carboxy-ceph-3-em-3-ylmethylthio]-1,3,4-thiadiazole disodium salt In 10 parts by volume of water is suspended 0.95 part by weight of 2,5-mercapto-1,3,4-thiadiazole. To the suspension is added 1N-sodium hydrogencarbonate to make a solution, to which are added 5.0 parts by weight of sodium 7-(2-thienylacetamido)cephalosporanic acid and 40 parts by volume of water. The reaction is continued at 60°C for 6 hours. The pH of the reaction mixture is adjusted to 2.0 with 1N hydrochloric acid, whereupon precipitates are formed. The precipitates are suspended in a small amount of water, followed by adjusting the pH to 7.0 with 1N-sodium hydroxide and subjecting to freeze-drying, whereby 5.0 parts by weight of the desired product is obtained in the form of pale yellowish powder.

IR(KBr,cm$^{-1}$): 1755 ($\beta$-lactam), 1670(—CONH—), 1610(—COO$^-$).

EXAMPLE 5

2,5-Bis[7-(2-thienylacetamido)-4-carboxy-ceph-3-em-3-ylmethylthio]-1,3,4-thiadiazole disodium salt In 30 parts by volume of water are dissolved 6.18 parts by weight of 2,5-bis(7-amino-4-carboxy-ceph-3-em-3-ylmethylthio)-1,3,4-thiadiazole disodium salt. While ice-cooling at about 0°C, to which are added 3.36 parts by weight of sodium bicarbonate and 20 parts by volume of ethyl ether. Then, 10 parts by volume of a solution of 1.92 part by weight of 2-thienylacetylchloride in ethyl ether is added over 10 minutes. The mixture is stirred at the same temperature for 1 hour and, then, at room temperature (25°C) for 1.5 hours. The aqueous layer is separated and, adjusted to pH 2 with 10 percent hydrochloric acid under cooling with ice, followed by treating in the same manner as Example 4, whereby 6.0 parts by weight of the desired product is obtained in the form of pale yellowish powder. The I.R. value of the product is in complete agreement with those of the compound obtained in Example 4.

EXAMPLE 6

2,5-Bis[7-($\alpha$-carboxyphenylacetamido)-4-carboxy-ceph-3-em-3-ylmethylthio]-1,3,4-thiadiazole tetrasodium salt To 30 parts by volume of water are added 0.75 part by weight of 2,5-dimercapto-1,3,4-thiadiazole and 1N sodium bicarbonate, to which are added 4.8 parts by weight of 7-($\alpha$-carboxyphenylacetoamido)cephalosporanic acid disodium salt and 20 parts by volume of dimethylformamide. The reaction is continued at 50°C for 3 hours with stirring. The pH of the reaction mixture is adjusted to 2.0 with 1N hydrochloric acid, whereupon the precipitate is separated therefrom. The product is suspended in a small amount of water, followed by adjusting the pH to 7.0 with 1N sodium hydroxide, and then freeze-drying to give 2.5 parts by weight of the desired product in the form of pale yellowish powder.

IR (KBr cm$^{-1}$): 1750($\beta$-lactam), 1670(—CONH—), 1600(—COO$^-$).

EXAMPLE 7

(1)
7-(2-thienylacetamido)-3-(2-mercapto-1,3,4-thiadiazol-5-ylthio)-methyl-ceph-3-em-4-carboxylic acid disodium salt In 30 parts by volume of water are suspended 4.2 parts by weight of 7-(2-thienylacetamido)-cephalosporanic acid sodium salt and 3.0 parts by weight of 2.5-dimercapto-1,3,4-thiadiazole. The pH is adjusted to 6.5 with 1N sodium hydroxide and the reaction is continued at 50°C for 3 hours with stirring. After adjustment of the pH to 1 with 1N hydrochloric acid, the crystals precipitated are filtered. The crystals are suspended in 30 parts by volume of water, followed by adjusting the pH to 6.5 with 1N sodium hydroxide, and then subjecting to concentrated-drying, whereby 4.6 parts by volume of the desired product is obtained in the form of greyish powder.

NMR(D$_2$O, ppm): 3.5(d, 2H), 3.9(S, 2H), 4.0(S, 1H), 4.35(S, 1H), 5.15(d, 1H), 5.65(d, 1H), 7.1(d, 2H), 7.45 (t, 1H). IR(KBr, cm$^{-1}$): 1760($\beta$-lactam), 1670(—CONH—), 1600(—COO$^-$).

(2)
2-[7-(2-thienylacetamido)-4-carboxy-ceph-3-em-3-ylmethylthio]-5-(7'-($\alpha$-carboxyphenylacetamido)-4'-carboxyceph-3'-em-3'-ylmethylthio]-1,3,4-thiadiazole trisodium salt In 20 parts by volume of water are dissolved 1.1 parts by weight of the powder obtained in Example 7-(1) and 0.98 part by weight of 7-($\alpha$-carboxyphenylacetamido)-cephalosporanic acid disodium salt. The mixture is treated in a manner similar to that described in Example 7-(1) to give 1.6 part by weight of the desired product in the form of pale-yellowish powder.

NMR(D$_2$O,ppm): 3.4(broad, S,4H), 3.8(s,2H), 4.1–4.5(m,4H), 5.1(d,2H), 5.7(d,2H), 7.1(S,2H), 7.5(S,6H). IR(KBr, cm$^{-1}$): 1770($\beta$-lactam), 1670(—CONH—), 1600(—COO$^-$).

EXAMPLE 8

7-(2-Thienylacetamido)-3-(2-mercapto-1,3,4-thiadiazol-5-ylthio)-methyl-ceph-3-em-4-carboxylic acid disodium salt In 40 parts by volume of water are dissolved 4.0 parts by weight of 7-amino-3-(2-mercapto-1,3,4-thiadiazol-5-ylthio)-methyl-ceph-3-em-4-carboxylic acid disodium salt. To the solution is added 0.9 part by weight of sodium bicarbonate, to which is added dropwise over 30 minutes the aqueous solution of 2.0 parts by weight of 2-thienyl-acetyl chloride and 20 parts by volume of ether and the mixture is stirred at a low temperature for 1 hour and another 1 hour at a room temperature.

The aqueous layer of the reaction mixture is separated and its pH is adjusted to 6.8 by 1N sodium hydroxide, followed by drying under reduced pressure at a low temperature. The product is chromatographed over Amberlite XAD-2 resin (trade name of Rohm and Haas Co.) and the fractions containing the desired product are gathered together and are concentrated to 50 parts by volume, freeze-dried, to give 1.65 part by weight of the product is obtained in the form of grayish powder. NMR and IR values of the obtained compound is the same as those of the compound obtained in Example 7-(1).

EXAMPLE 9

(1)
7-(2-Oxo-pyrimidin-4-ylthio-acetamido)-cephalosoranic acid sodium salt In 10 parts by volume of water is dissolved 1.0 part by weight of 7-bromoacetamido-cephalosporanic acid sodium salt. To the solution is added the solution prepared by mixing 0.3 part by weight of 2-oxo-4-mercapto-pyrimidine with 20 parts by volume of 1/10 N sodium hydroxide dropwise with stirring under cooling and stirred for another 1 hour. After the addition of 1N hydrochloric acid to the reaction mixture, the precipitates separated therefrom are filtered. The precipitates are suspended in 20 parts by volume of water, followed by adjusting the pH to 6.5 with 1N sodium hydroxide, and then subjecting to concentrated to dryness, whereby 0.95 part by weight of the desired product is obtained in the form of yellowish powder.

NMR($D_2O$, ppm); 2.1(S,3H), 3.45(d,2H), 4.0(S,2H), 4.8(d,2H), 5.1(d,1H), 5.7(d,1H), 6.65(d,1H), 7.75(d,1H). IR(KBr, cm$^{-1}$): 1765($\beta$-lactam), 1750(—OCO—), 1670(—CONH—), 1600(—COO$^-$).

(2)

2-[7-(2-Oxo-pyrimidine-4-ylthio-acetamido)-4-carboxyceph-3-em-3-ylmethylthio]-5-[7'-(2'-thienylacetamido)-4'-carboxy-ceph-3'-em-3'-ylmethylthio]-1,3,4-thiadiazole disodium salt In 40 parts by volume of water are dissolved 1.1 part by weight of the powder obtained in Example 7-(1) and 0.92 part by weight of the powder obtained in Example 9-(1).

The mixture is treated in a manner similar to that described in Example 7-(2) to give 1.55 part by weight of the desired product in the form of pale-yellowish powder.

NMR($D_2O$, ppm): 3.5(m,4H), 3.9(m,4H), 4.2(m,2H), 5.1(m,2H), 5.7(m,2H), 6.5(m,1H), 7.7(m.1H), 7.0(m,2H), 7.3(m,1H). IR(KBr, cm$^{-1}$): 1765($\beta$-lactam), 1670(—CONH—), 1605(—COO$^-$).

EXAMPLE 10

2,5-Bis-[7-($\alpha$-carbamoylphenylacetamido)-4-carboxyceph-3-em-3-ylmethylthio]-1,3,4-thiaxiazole disodium salt In 10 parts by volume of water are suspended 0.75 part by weight of 2.5-dimercapto-1,3,4-thiadiazole and 2,3 parts by weight of 7-($\alpha$-carbamoylphenylacetamido)-cephalosporanic acid. The mixture is treated in a manner similar to that described in Example 4 to give 2.5 parts by weight of the desired product as powders.

NMR($D_2O$, ppm); 3.45(m,4H), 4.2(m,4H), 5.0(m,2H), 5.6(m,2H), 7.45(S,10H). IR(KBr, cm$^{-1}$): 1760($\beta$-lactam), 1685(—CONH$_2$, —CONH—), 1620(—COO$^-$).

EXAMPLE 11

(1)

7-($\alpha$-N-isobornyloxycarbonylaminophenylacetamido)-cephalosporanic acid sodium salt In 20 parts by volume of water are dissolved 2.0 parts by weight of 7-($\alpha$-aminophenylacetamido)-cephalosporanic acid sodium salt and 20 parts by volume of tetrahydrofuran are added. To the solution is added 1.2 part by weight of isobornyloxycarbonylchloride dropwise under cooling, while adjusting the pH to 7-8 with 1N sodium hydroxide, and the reaction is continued for 2 hours. After the reaction mixture is washed with 100 parts by volume of ethyl acetate, the aqueous layer is adjusted to pH 2.0 with 1N hydrochloric acid and is extracted with 100 parts by volume of ethyl acetate. The extract is dried with sodium sulfate, followed by subjecting to concentrated to dryness to give 1.9 part by weight of the desired product in the form of yellowish powder.

IR (KBr, cm$^{-1}$): 1760($\beta$-lactam), 1720(—OCO—), 1685(—CONH—), 1610(—COO$^-$).

(2)

2.5-Bis-[7-($\alpha$-aminophenylacetamido)-4-carboxyceph-3-em-3-ylmethylthio]-1,3,4-thiadiazole ditrifluoroacetate In 20 parts by volume of water are suspended 0.2 part by weight of 2.5-dimercapto-1,3,4-thiadiazole and 1.6 part by weight of the powder obtained in Example 11-(1). The mixture is adjusted to pH 6.5 with 1N sodium bicarbonate and heated at 50°C for 6 hours. After adjustment of the pH to 2 with 1N hydrochloric acid, the reaction mixture is extracted with 50 parts by volume of ethyl acetate. The extract is dried with sodium sulfate and concentrated to dryness. To the dried product thus obtained are added 15 parts by volume of trifluoroacetic acid and 1 part by volume of anisol, and the mixture is stirred at room temperature for 1 hour. The reaction mixture is concentrated to dryness, and then the powder thus obtained is washed with 30 parts by volume of ether and dried to give 1.4 part by weight of the desired product in the form of pale-yellowish powder.

IR (KBr, cm$^{-1}$): 1770($\beta$-lactam), 1710(—CONH—), 1615(—COO$^-$).

EXAMPLE 12

(1)

7-($\alpha$-Carbamoyloxyphenylacetamido)-cephalosporanic acid sodium salt

In 1.02 part by weight of triethylamine and 20 parts by volume of dioxane is dissolved 1.95 part by weight of $\alpha$-carbamoyloxyphenylacetic acid. To the solution is added dropwise under cooling 1.40 part by weight of isobutylchloroformate dissolved in 20 parts by volume of dioxane.

10 Parts by volume of acetone is added to the mixture, then precipitating crystals are filtered off. The filtrate is added dropwise to an aqueous solution of 2.72 parts by weight of 7-aminocephalosporanic acid in 20 parts by volume of 1N sodium hydroxide. The mixture is allowed to stand for 30 minutes while cooling and further for 30 minutes at room temperature. The reaction mixture is washed with 20 parts by volume of ethyl acetate, and to the remaining aqueous layer is added 30 parts by volume of ethyl acetate. After adjustment of the pH to 1.5 with hydrochloric acid, the ethyl acetate layer is separated. 40 Parts by volume of water is added to the ethyl acetate layer and the mixture is adjusted to pH 6.5 with 1N sodium hydroxide, and then the aqueous layer is separated, followed by freeze-drying, whereupon 2.0 parts by weight of the desired product is obtained as powder.

NMR ($D_2O$, ppm): 5.05(q,1H), 5.62(t,1H). IR(KBr, cm$^{-1}$): 1765($\beta$-lactam), 1733(—O—CONH$_2$, —O—COCH$_3$), 1690(—CONH—).

(2)

2.5-Bis-[7-($\alpha$-carbamoyloxyphenylacetamido)-4-carboxy-ceph-3-em-3-ylmethylthio]-1,3,4-thiadiazole disodium salt In 10 parts by volume of water are suspended 1.0 part by weight of the obtained powder in Example 12-(1) and 0.18 part by weight of 2.5-dimercapto-1,3,4-thiadiazole. The mixture is treated in a manner similar to that described in Example 4, to give 0.8 part by volume of the desired product as powder.

NMR (D₂O, ppm); 3.0(broad, d,2H), 4.1(m,2H), 5.3(m,1H), 5.75(d,1H), 7.7(S,5H). IR (KBr, cm⁻¹): 1750($\beta$-lactam), 1700(—CONH—), 1615(—COO⁻).

EXAMPLE 13

(1)

chloro-pyrimidin-4-ylthioacetamido)-cephalosporanic acid sodium salt

In 20 parts by volume of water is dissolved 2.0 parts by weight of 7-bromoacetamido cephalosporanic acid sodium salt, to which is added dropwise over 30 minutes 0.7 part by weight of 2-chloro-4-mercapto pyrimidine dissolved in 40 parts by volume of 1/10N sodium hydroxide. The mixture is stirred for 2 hours.

The reaction mixture is treated in a manner similar to that described in Example 12-(1) to give 2.1 parts by weight of the desired product as powder.

NMR (D₂O, ppm): 2.12(S,3H), 3.5(d,2H), 4.1(S,2H), 5.1(d,1H), 5.65(d,1H), 7.45(d,1H), 8.35(d,1H). IR(KBr, cm⁻¹): 1770($\beta$-lactam), 1685(—CONH—), 1620(—COO⁻).

(2)

2.5-bis-[7-(2-chloro-pyrimidin-4-ylthioacetamido)-4-carboxy-ceph-3-em-3-ylmethylthio]-1,3,4-thiadiazole disodium salt In 30 parts by volume of water are suspended 1.8 parts by weight of the powder obtained in Example 13-(1) and 0.42 part by weight of 2.5-dimercapto-1,3,4-thiadiazole. The pH of the suspension is adjusted to 6.5 with 1N sodium bicarbonate and heated at 50°C for 8 hours, followed by concentration to dryness to give 2.05 parts by volume of the desired product in the form of powder.

NMR (D₂O, ppm); 3.6 (m.4H), 4.15(S,4H), 5.4(m,2H), 5.7(m,2H), 7.5(d,2H), 8.45(d,2H). IR(KBr, cm⁻¹): 1760($\beta$-lactam), 1680(—CONH—), 1610(—COO⁻).

EXAMPLE 14

(1)

7-(2-Oxo-5-methylpyrimidin-4-ylthioacetamido)-cephalosporanic acid sodium salt

In 20 parts by volume of water is dissolved 2 parts by weight of 7-bromoacetamido cephalosporanic acid sodium salt, to which is added dropwise over 30 minutes, the aqueous solution of 0.7 part by weight of 2-oxo-4-mercapto-5-methylpyrimidine dissolved in 40 parts by volume of N/10 sodium hydroxide. The mixture solution is stirred for another 2 hours. The reaction mixture is washed with 50 parts by volume of ethyl acetate, and then the aqueous layer is concentrated to dryness to give 2.2 parts by weight of the desired product as powder.

MMR (D₂O, ppm): 2.05(S, 3H), 2.10(S,3H), 3.45(d,2H), 4.02(S,2H), 5.08(d,1H), 5.68(d,1H), 7.25(S1H). IR(KBr,cm⁻¹): 1765($\beta$-lactam), 1670(—CONH—), 1640(—COO⁻).

(2)

2.5-Bis-[7-(2-oxo-5-methyl-pyrimidin-4-ylthioacetamido)-4-carboxy-ceph-3-em-3-ylmethylthio]-1,3,4-thiadiazole disodium salt In 30 parts by volume of water are suspended 2.0 parts by weight of the powder obtained in Example 14-(1) and 0.32 part by weigh of 2.5-dimercapto-1,3,4-thiadiazole. The suspension is treated in a manner similar to that described in Example 13-(2) to give 1.85 part by weight of the desired product as powder.

NMR (D₂O, ppm): 2.0(m,6H), 3.5(m,4H), 4.1(S,4H), 5.4(m,2H), 5.7(m2H), 7.3(d,2H). IR (KBr, cm⁻¹): 1760($\beta$-lactam), 1665(—CONH—), 1630(—COO⁻).

EXAMPLE 15

2,5-Bis-[7-(2-oxo-pyrimidin-4-ylthioacetamido)-4-carboxy-ceph-3-em-3-ylmethylthio]-1,3,4-thiadiazole disodium salt In 10 parts by volume of water are dissolved 1.5 part by weight of 2.5-dimercapto-1,3,4-thiadiazole and 4.7 parts by weight of 7-(2-oxo-pyrimidin-4-ylthioacetamido)-ceph-3-em-4-carboxylic acid sodium salt. The solution is treated in a manner similar to that described in Example 4, to give 5.0 parts by weight of the desired product as pale-yellowish powder.

NMR (D₂O, ppm): 3.5(m,4H), 4.0(S,4H), 5.1(d,2H), 5.5(m,2H), 6.7(d,2H), 7.55(d,2H). IR (KBr,cm⁻¹): 1765($\beta$-lactam), 1670(—CONH—), 1610(—COO⁻).

EXAMPLE 16

2-[7-(2-Thienylacetamido)-4-carboxy-ceph-3-em-3-ylmethylthio]-5-[7'-($\alpha$-sulfophenylacetamido)-4'-carboxy-ceph-3'-em-3'-ylmethylthio]-1,3,4-thiadiazole trisodium salt In 30 parts by volume of water are dissolved 1.1 part by weight of the powder obtained in Example 7-(1) and 1.05 part by weight of 7-($\alpha$-sulfophenylacetamido)-cephalosporanic acid disodium salt. The pH of the solution is adjusted to 6.5 with 1N sodium hydroxide and the solution is stirred at 50°C for 5 hours. By adjusting pH of the reaction mixture to 2.0 with 1N hydrochloric acid, the crystals precipitated are collected by filtration. The crystals are suspended in 30 parts by volume of water and the pH is adjusted to 6.5 with 1N sodium hydroxide, followed by concentration to dryness to give 1.30 part by weight of the desired product as powder.

NMR (D₂O ppm): 3.55(d,4H), 3.90(S,2H), 3.95(S,1H), 4.25(d,4H), 5.18(d,2H), 5.65(d,2H), 7.10(s,2H), 7.45–7.65(m,6H). IR (KBr,cm⁻¹): 1760($\beta$-lactam), 1670(—CONH—), 1605(—COO⁻).

EXAMPLE 17

(1)

2-[7-(2-Thienylacetamido)-4-carboxy-ceph-3-em-3-ylmethylthio]-5-[7'-amino-4'-carboxy-ceph-3'-em-3'-ylmethylthio]-1,3,4-thiadiazole disodium salt In 20 parts by volume of water are dissolved 1.1 part by weight of the powder obtained in Example 7-(1) and 1.0 part by weight of 7-(iso-bornyloxycarbonylamino)-cephalosporanic acid sodium salt. The ph of the solution is adjusted to 6.8 with 1N sodium bicarbonate and heated at 50°C for 4 hours with stirring. The reaction mixture is cooled and the pH is adjusted to 2.0 with 1N hydrochloric acid. The crystals precipitated are collected by filtration, and the crystals are dried. The crystals thus obtained are dissolved in a mixture of 20 parts by volume of trifluoroacetic acid and 1 part by volume of anisol and the solution is stirred at room temperature for 2 hours. The solvent is removed by distillation and 50 parts by volume of ether is added to the residue, then precipitating crystals are collected by filtration then washed with 20 parts by volume of ether. So washed crystals are suspended in 35 parts by volume of water. The pH of the suspension is adjusted to 7.5 with 1N sodium hydroxide, followed by freeze-drying the suspension to give 1.38 part by weight of the desired product as grayish powder.

NMR (D$_2$O, ppm): 3.55(d,4H), 3.88(S,3H), 4.2(d,2H), 5.08(d,2H), 5.65(d,H), 7.0(d,2H), 7.30(d,H). IR (KBr,cm$^{116}$ $^1$): 1765($\beta$-lactam), 1670(—CONH—), 1605(—COO$^-$).

EXAMPLE 18

2-[7-(2-Thienylacetamido)-4-carboxy-ceph-3-em-3-ylmethylthio]-5-(7'-amino-4'-carboxy-ceph-3'-em-3'-ylmethylthio]-1,3,4-thiadiazole, disodium salt In 25 parts by volume of water is suspended 1.6 parts by weight of 2.5-bis(7-amino-4-carboxy-ceph-3-em-3-ylmethylthio)-1,3,4-thiadiazole ditrifluoroacetate. The mixture is adjusted to pH 7.2 with 1N sodium hydroxide under cooling, to which is added 0.9 part by weight of sodium bicarbonate. To the mixture solution is added dropwise over 15 minutes 0.4 part by weight of 2-thienylacetylchloride dissolved in 15 parts by volume of ether. On cooling, the reaction is continued for 1 hour and is stirred at room temperature for another 1 hour. The aqueous layer is separated and concentrated to dryness at a low temperature. After the concentrate is dissolved in 10 parts by volume of water, the mixture is subjected to column-chromatography with Amberlite XAD-2 resin (trade name of Rohm and Haas Co.) and the fractions containing the desired product are combined and concentrated to 30 parts by volume, and then freeze-dried whereby 0.62 part by weight of the product is obtained in the form of pale yellowish powder. NMR and IR values of the obtained compound are the same as those of the compound obtained in Example 17.

EXAMPLE 19

2-([7-(2-Thienylacetamido)-4-carboxy-ceph-3-em-3-ylmethylthio]-5-[7'-amino-4'-carboxy-ceph-3'-em-3'-ylmethylthio]-1,3,4-thiadiazole, disodium salt In 30 parts by volume of water is dissolved 2.0 parts by weight of 7-amino-3-(2-mercapto-1,3,4-thiadiazol-5-ylthio)-methyl-ceph-3-em-4-carboxylic acid disodium salt. To the solution in added 2.10 parts by weight of 7-(2-thienylacetamido)-cephalosporanic acid, and the pH is adjusted to 6.5 with 1N hydrochloric acid, then the mixture is heated at 50°C for 4 hours. The pH of the reaction mixture is adjusted to 3.0 with 1N hydrochloric acid, then resulting precipitates are collected by filteration. The powdery precipitates are suspended in 30 parts by volume of water and its pH is adjusted to 7.0 with 1N sodium hydroxide, followed by freeze-drying to give 3.4 parts by weight of the desired products in the form of pale-yellowish powder. The NMR and IR values of the obtained product are the same as those of the compound obtained in Example 17.

EXAMPLE 20

2-[7-(2-Thienylacetamido)-4-carboxy-ceph-3-em-3-ylmethylthio]-5-(7'-($\alpha$-carboxyphenylacetamido)-4'-carboxy-ceph-3'-em-3'-ylmethylthio]-1,3,4-thiadiazole trisodium salt In 30 parts by volume of water is dissolved 3.0 parts by weight of the powder obtained in Example 17. To the solution is added while cooling 0.35 part by weight of sodium bicarbonate, to which is added dropwise over 15 minutes 0.6 part by weight of $\alpha$-carboxyphenylacetylchloride dissolved in 15 parts by volume of ether. The mixture solution is stirred on cooling for 1 hour and at room temperature for another 1 hour. The aqueous layer of the reaction mixture is separated and is concentrated to dryness at a low temperature. After the concentrate is dissolved in 20 parts by volume of water, the solution is chromatographed over Amberlite XAD-2 resin (trade name of Rohm and Haas Co.) and the fractions containing the desired product are combined and are concentrated to 40 parts by volume, followed by freeze-drying to give 1.85 parts by weight of the product is obtained in the form of grayish powder. NMR and IR values of the obtained compound are the same as those of the compound obtained in Example 7-(2).

What we claim is:

1. A compound of the formula

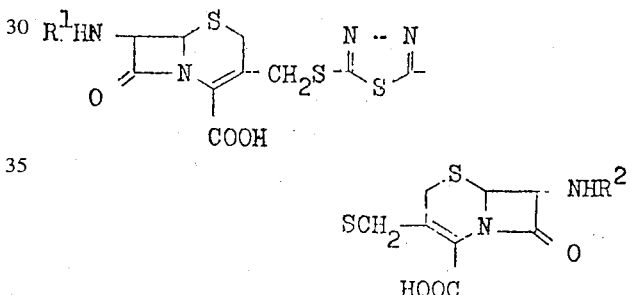

wherein R$^1$ and R$^2$ are, the same or different, hydrogen atom or an acyl group of the formula:

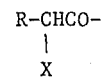

wherein R represents phenyl, phenylthio, thienyl, 2-oxo-primidin-4-ylthio, 2-chloro-pyrimidin-4-ylthio, pyridylthio or 2-oxo-5-methyl-pyrimidin-4-ylthio and X represents hydrogen, carboxyl, carbamoyl, carbamoyloxy, amino, or sulfo, or pharmaceutically acceptable salt, thereof.

2. A compound according to claim 1, wherein R$^1$ and R$^2$ stand for the same acyl group.

3. A compound according to claim 2, namely, 2,5-bis-[7-(2-thienylacetamido)-4-carboxy-ceph-3-em-3-ylmethylthio]-1,3,4-thiadiazole.

4. A compound according to claim 2, namely, 2,5-bis-[7-($\alpha$-carboxyphenylacetamido)-4-carboxy-ceph-3-em-3-ylmethylthio]-1,3,4-thiadiazole.

5. A compound according to claim 2, namely, 2,5-bis-[7-($\alpha$-carbamoyloxyphenylacetamido)-4-carboxy-ceph-3-em-3-ylmethylthio]-1,3,4-thiadiazole.

6. A compound according to claim 2, namely, 2,5-bis-[7-($\alpha$-carbamoylphenylacetamido)-4-carboxy-ceph-3-em-3-ylmethylthio]-1,3,4-thiadiazole.

7. A compound according to claim 2, namely, 2,5- bis-[7-(α-aminophenylacetamido)-4-carboxy-ceph-3-em-3-ylmethylthio]-1,3,4-thiadiazole.

8. A compound according to claim 2, namely, 2,5-bis-[7-(2-oxo-pyrimidin-4-ylthioacetamido)-4-carboxy-ceph-3-em-3-ylmethylthio]-1,3,4-thiadiazole.

9. A compound according to claim 2, namely, 2,5-bis-[7-(2-chloro-pyrimidin-4-ylthioacetamido)-4-carboxy-ceph-3-em-3-ylmethylthio]-1,3,4-thiadiazole.

10. A compound according to claim 2, namely, 2,5-bis-[7-(2-oxo-5-methyl-pyrimidin-4-ylthioacetamido)-4-carboxy-ceph-3-em-3-ylmethylthio]-1,3,4-thiadiazole.

11. A compound according to claim 1, wherein $R^1$ and $R^2$ are respectively stand for hydrogen atom.

12. A compound according to claim 11, namely, 2,5-bis-(7-amino-4-carboxy-ceph-3-em-3-ylmethylthio)-1,3,4-thiadiazole.

13. A compound according to claim 1, wherein $R^1$ and $R^2$ respectively stand for acyl groups different from each other.

14. A compound according to claim 13, namely, 2-[7-(2-oxo-pyrimidin-4-ylthioacetamido)-4-carboxy-ceph-3-em-3-ylmethylthio]-5-[7'-(2'-thienylacetamido)-4'-carboxy-ceph-3'-em-3'-ylmethylthio]-1,3,4-thiadiazole.

15. A compound according to claim 13, namely, 2-[7-(2-thienylacetamido)-4-carboxy-ceph-3-em-3-ylmethylthio]-5-[7'-(α-carboxyphenylacetamido)-4'-carboxy-ceph-3'-em-3'-ylmethylthio]-1,3,4-thiadiazole.

16. A compound according to claim 13, namely, 2-[7-(2-thienylacetamido)-4-carboxy-ceph-3-em-3-ylmethylthio]-5-[7'-(α-sulfophenylacetamido)-4'-carboxy-ceph-3'-em-3'-ylmethylthio]-1,3,4-thiadiazole.

17. A compound according to claim 13, namely, 2-[7-(2-thienylacetamido)-4-carboxy-ceph-3-em-3-ylmethylthio]-5-[7'-amino-4'-carboxy-ceph-3'-em-3'-ylmethylthio]-1,3,4-thiadiazole.

* * * * *